United States Patent
Greywall et al.

(10) Patent No.: US 6,980,339 B2
(45) Date of Patent: Dec. 27, 2005

(54) DEFORMABLE MEMS MIRROR

(75) Inventors: Dennis S. Greywall, Whitehouse Station, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/741,491

(22) Filed: Dec. 19, 2003

(65) Prior Publication Data

US 2005/0134955 A1 Jun. 23, 2005

(51) Int. Cl.$^7$ .......................... G02B 26/08; G02B 26/00
(52) U.S. Cl. ...................... 359/198; 359/295
(58) Field of Search .................. 359/223, 224, 359/230, 290, 291, 295, 298, 846, 198

(56) References Cited

U.S. PATENT DOCUMENTS

| | | | |
|---|---|---|---|
| 4,655,563 A * | 4/1987 | Plante et al. ................. 359/849 |
| 5,501,893 A | 3/1996 | Laermer et al. ............ 428/161 |
| 5,629,790 A | 5/1997 | Neukermans et al. ........ 359/198 |
| 5,903,380 A * | 5/1999 | Motamedi et al. .......... 389/224 |
| 6,178,033 B1 * | 1/2001 | Ford et al. .................. 359/247 |
| 6,201,631 B1 | 3/2001 | Greywall .................... 389/245 |
| 2004/0218877 A1 * | 11/2004 | Xie ............................. 385/93 |

* cited by examiner

Primary Examiner—Georgia Epps
Assistant Examiner—William Choi (57) ABSTRACT

A MEMS device having a deformable mirror. In representative embodiments, the MEMS device includes (1) a deformable plate having a reflective surface and movably connected to a substrate and (2) a deformation actuator mounted on the plate such that, when the plate moves with respect to the substrate, the actuator moves together with the plate without any changes in the relative position of the plate and the actuator. In one embodiment, the actuator has (i) a first electrode, one end of which is attached to an edge of the plate and (ii) a second electrode attached to an interior portion of the plate. When a voltage differential is applied between the first and second electrodes, an unattached end of the first electrode moves with respect to the second electrode, thereby applying a deformation force to the plate. Advantageously, motion and deformation of the deformable plate in such MEMS device are decoupled.

28 Claims, 7 Drawing Sheets

DEFORMABLE MEMS MIRROR

CROSS-REFERENCE TO RELATED APPLICATIONS

The subject matter of this application is related to that of U.S. patent application Ser. No. 10/394,359, identified by attorney docket No. Neilson 13, filed Mar. 21, 2003, entitled "Dispersion Compensator," and referred to hereafter as "the Neilson application," the teachings of which are incorporated herein by reference.

BACKGROUND OF THE INVENTION

1. Field of the Invention

The present invention relates to optical communication equipment and, more specifically, to micro-electromechanical (MEMS) devices for use in such equipment.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

A representative adaptive optical element is a movable deformable mirror that may be used, for example, in an optical communication system designed to route optical signals. In such an application, the mirror is tilted to direct the optical signal to a selected output port. In addition, the mirror may be deformed to compensate for possible signal distortions accrued during prior signal propagation. The mirror deformation is chosen such that the distortions are significantly reduced, thus improving receiver performance. However, one problem with such prior-art systems is that the mirror rotation and deformation may be disadvantageously coupled.

SUMMARY OF THE INVENTION

Problems in the prior art are addressed, in accordance with the principles of the present invention, by a MEMS device having a deformable mirror, for which the mirror deformation is decoupled from and hence independent of the mirror rotation. This is achieved by employing a deformation actuator that moves so as to decouple the mirror rotation and deformation. In representative embodiments, the MEMS device includes (1) a deformable plate having a reflective surface, the plate being movably connected to a substrate, and (2) a deformation actuator mounted on the plate such that, when the plate moves with respect to the substrate, the actuator moves together with the plate without any changes in the relative position of the plate and the actuator. In one embodiment, the actuator has (i) a first electrode, one end of which is attached to an edge of the plate and (ii) a second electrode attached to an interior portion of the plate. When a voltage differential is applied between the first and second electrodes, an unattached end of the first electrode moves with respect to the second electrode, thereby applying a deformation force to the plate. Advantageously, motion and deformation of the deformable plate in such MEMS device are decoupled.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
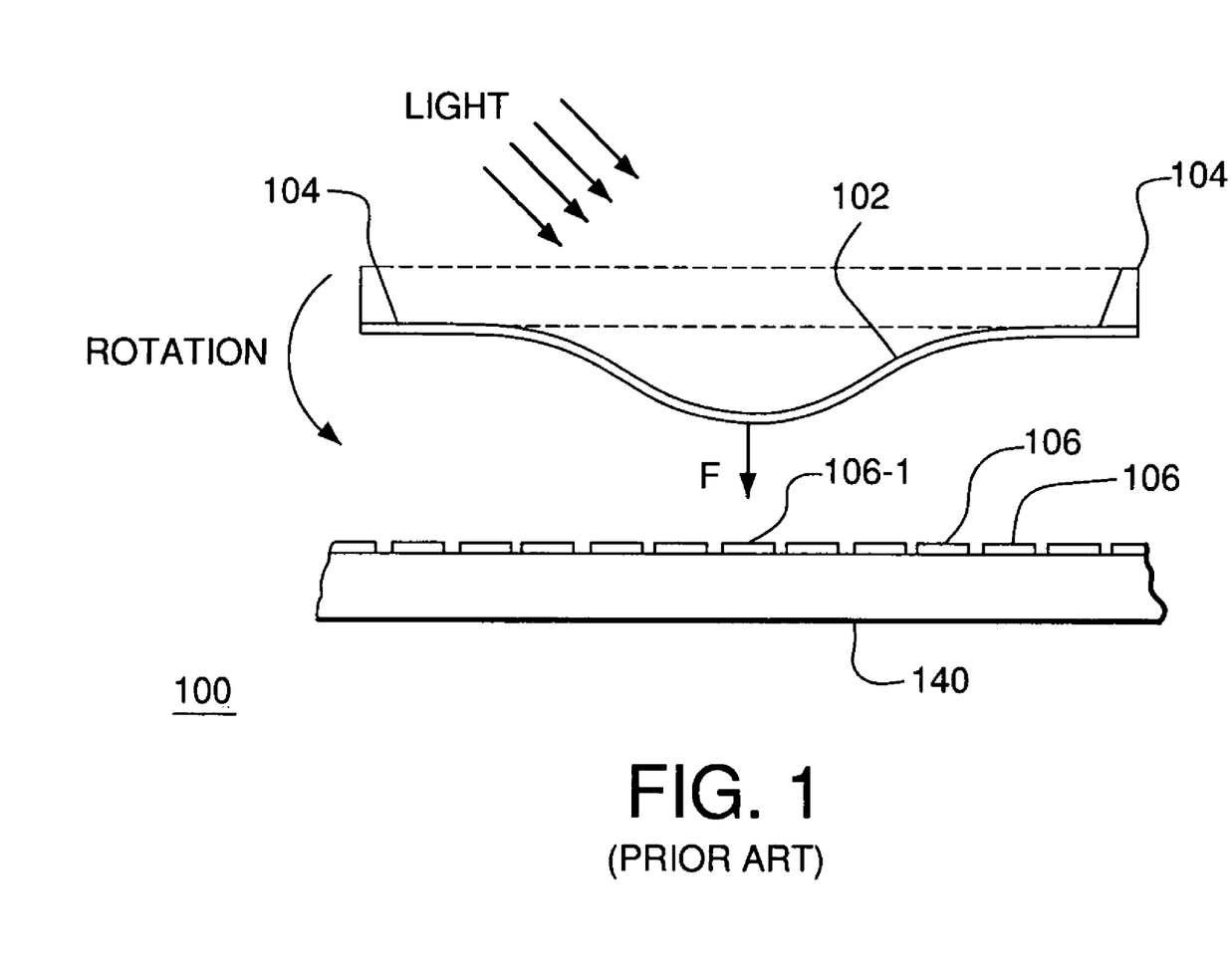
FIG. 1 shows a schematic cross section of a prior-art device having a deformable membrane.

FIG. 1 shows a representative prior-art device 100 having a deformable light-reflecting membrane 102 mounted on a movable support structure 104. Support structure 104 is attached to a corresponding motion actuator (not shown) that can rotate said support structure (together with membrane 102) with respect to a substrate 140, e.g., as indicated by the "rotation" arrow in FIG. 1. In addition, device 100 has a deformation actuator comprising a plurality of electrodes 106 attached to substrate 140. Each electrode 106 can be individually biased by applying a voltage differential between that electrode and membrane 102 (typically at ground potential). For example, when electrode 106-1 is biased, an attractive electrostatic force (F) is exerted between that electrode and membrane 102 causing the membrane, initially flat, to deform into the shape indicated in FIG. 1.

One problem with device 100 is that rotation of support structure 104 changes the relative position of membrane 102 and electrodes 106, which changes the deformation force field acting upon the membrane and consequently the shape of the membrane. Thus, rotation and deformation of membrane 102 in device 100 are disadvantageously coupled.

Figure 2:
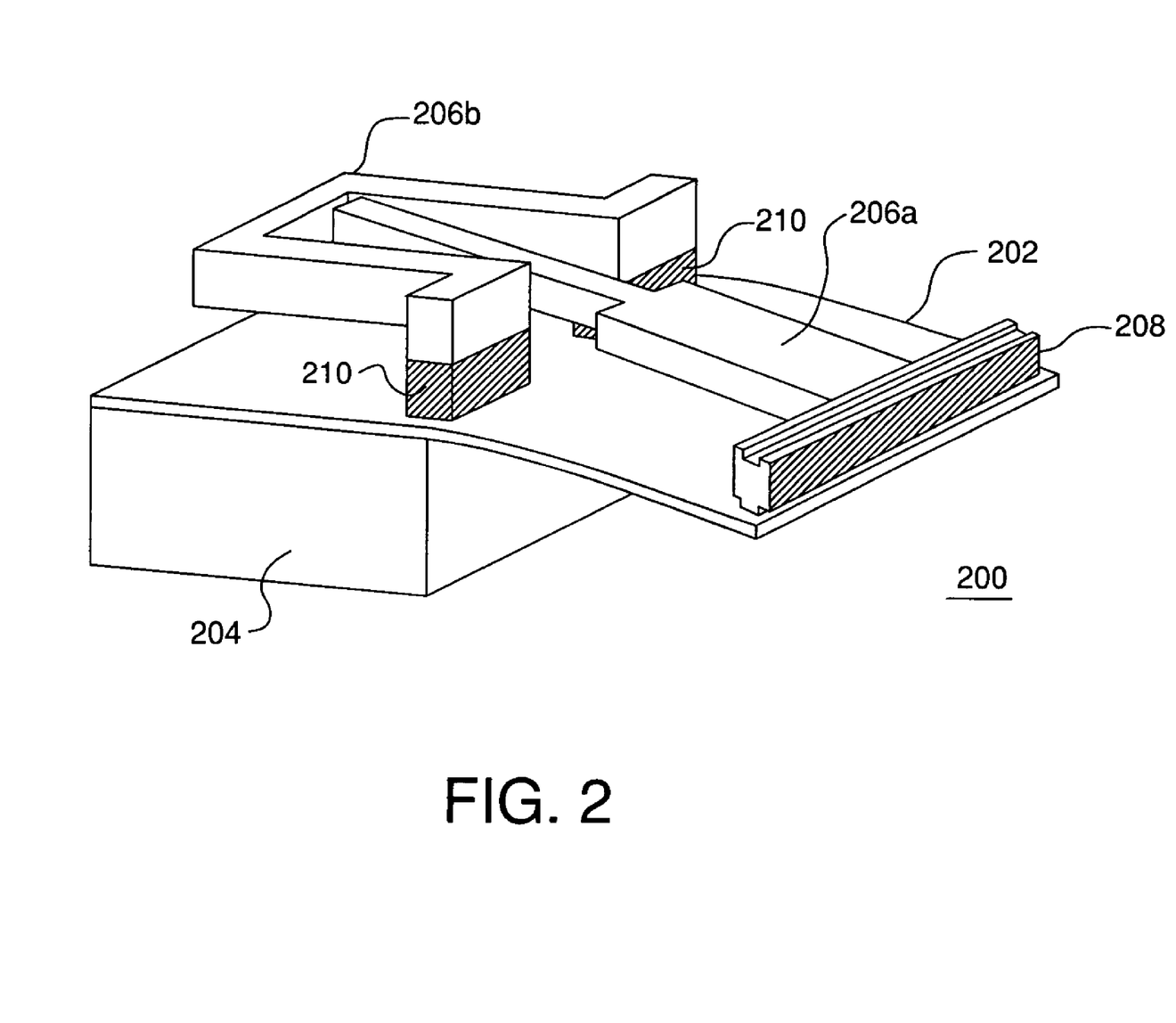
FIG. 2 illustrates a perspective three-dimensional view of a MEMS device having a deformable membrane according to one embodiment of the invention.

FIG. 2 illustrates a perspective three-dimensional view of a MEMS device 200 according to one embodiment of the present invention. Device 200 has a deformable membrane 202 attached to a support structure 204 in a cantilevered configuration, which membrane can be deformed using a deformation actuator 206 having two electrodes 206a–b. Electrode 206a is attached to a support beam 208 located at an edge of membrane 202. When membrane 202 is in a non-deformed (i.e. flat) state, electrode 206a extends parallel to the surface of the membrane such that there is a small gap between the membrane surface and the electrode. Electrode 206b is Π-shaped and mounted on a pair of spacers 210 such that (i) similar to electrode 206a, electrode 206b extends parallel to the membrane surface and (ii) the gap between the membrane surface and electrode 206b is greater than the gap between the membrane surface and electrode 206a.

When there is no voltage differential between electrodes 206a–b, the membrane is flat and the electrodes are parallel to the membrane surface and vertically offset with respect to each other. However, when electrode 206b is biased with respect to electrode 206a, an attractive electrostatic force generated between the electrodes pulls the free (unattached) end of electrode 206a upward thereby deforming membrane 202 as shown in FIG. 2. The elastic spring force produced due to the membrane deformation acts to counterbalance the electrostatic force.

In one embodiment, support structure 204 is movably mounted on a substrate (not shown). When support structure 204 moves (e.g., rotates) with respect to the substrate, membrane 202 and actuator 206 move together with the support structure without any changes in the relative position of the membrane and the actuator. Thus, rotation and deformation of membrane 202 in device 200 are advantageously decoupled.

Figure 3A:
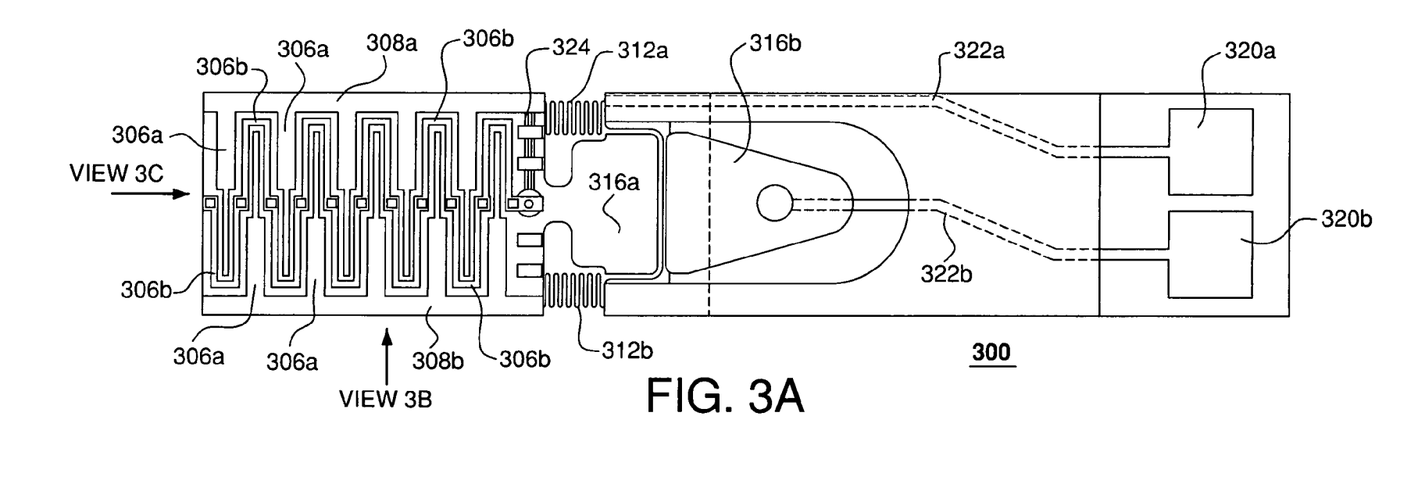
FIGS. 3A–C show schematic top and side views of a MEMS device having a deformable plate according to another embodiment of the present invention.
Figure 3B:
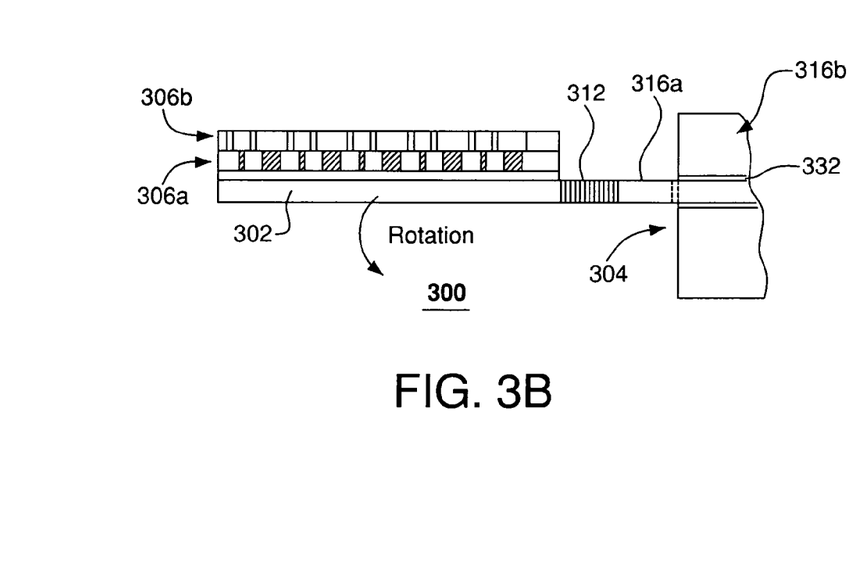
Figure 3C:
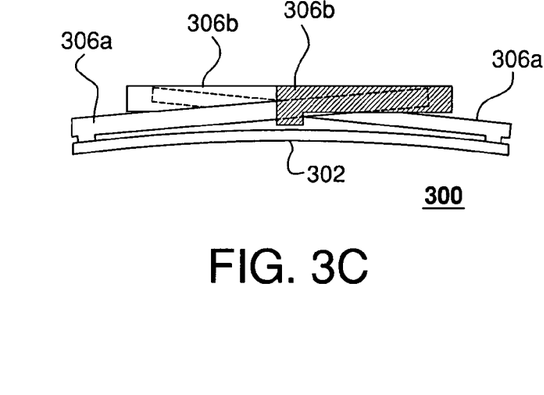

FIGS. 3A–C show a MEMS device 300 according to another embodiment of the present invention. More specifically, FIG. 3A shows a top view of device 300, and FIGS. 3B–C show side views of device 300 along the view directions indicated by the "view" arrows in FIG. 3A. Device 300 has (i) a movable deformable plate 302 supported on a substrate 304 by a pair of serpentine springs 312a–b and (ii) two electrostatic actuators 306 and 316. Actuator 306 is adapted to deform plate 302, e.g., as indicated in FIG. 3C, and actuator 316 is adapted to rotate plate 302 with respect to substrate 304, e.g., as indicated by the "rotation" arrow in FIG. 3B.

Actuator 306 is based on a similar concept as actuator 206 (FIG. 2) and comprises a plurality of electrodes 306a and a plurality of electrodes 306b. Each electrode 306a is similar to electrode 206a and is attached to a corresponding support beam 308 located at an edge of plate 302 such that the electrodes attached to beam 308a are interleaved with the electrodes attached to beam 308b. Electrodes 306a are electrically connected to plate 302, which in turn is electrically connected to substrate 304 via spring 312b. In a preferred configuration, electrodes 306a, plate 302, and substrate 304 are at ground potential. Each electrode 306b is similar to electrode 206b and is mounted on a corresponding pair of spacers attached to plate 302 near the center axis of the plate. Electrodes 306b are electrically isolated from plate 302 using the electrical insulation of the spacers and can be electrically biased using a contact pad 320a to which they are electrically connected via a conducting trace 324, spring 312a, and a conducting trace 322a.

When there is no voltage differential between electrodes 306a–b, plate 302 is flat and the electrodes are parallel to the plate surface. When electrodes 306b are biased with respect to electrodes 306a, e.g., by a bias voltage applied to pad 320a, an attractive electrostatic force generated between the electrodes pulls the suspended (unattached) ends of electrodes 306a upward, thereby deforming plate 302 as shown in FIG. 3C. It can be shown that plate 302 has a curvature value substantially proportional to the square of the bias voltage, where curvature is quantified as a reciprocal curvature radius.

Actuator 316 is a fringe-field (FF) actuator similar to FF actuators disclosed in commonly owned U.S. patent application Ser. No. 10/261,088, filed on Sep. 30, 2002 and entitled "Monolithic Two-Axis MEMS Device for Optical Switches," the teachings of which are incorporated herein by reference. Briefly, actuator 316 has two electrodes 316a–b. Electrode 316a is an extension of plate 302 and therefore is at ground potential in the configuration described above. Electrode 316b is a stationary electrode mounted on substrate 304 and located in proximity to electrode 316a as shown in FIGS. 3A–B. Electrode 316b is electrically isolated from substrate 304 using electrical insulation of an underlying thin insulating layer 332 and can be electrically biased using a contact pad 320b electrically connected to the electrode via a conducting trace 322b.

When there is no voltage differential between electrodes 316a–b, springs 312 keep plate 302 in a (horizontal) position shown in FIG. 3B. However, when electrode 316b is biased with respect to electrode 316a, e.g., by a bias voltage applied to pad 320b, an attractive electrostatic force generated between the electrodes pulls electrode 316a upward, thereby deflecting plate 302 downward as indicated by the "rotation" arrow in FIG. 3B. It should be noted that, when plate 302 moves (e.g., rotates) with respect to substrate 304, actuator 306 moves together with the plate without any changes in the relative positions of electrodes 306a–b. Thus, rotation and deformation of plate 302 in device 300 are advantageously decoupled similar to the rotation and deformation of membrane 202 in device 200 (FIG. 2).

One possible application of device 300 is described in the above-cited Nielson application. Briefly, Nielson teaches a dispersion compensator having a diffraction grating operating in reflection and optically coupled to a mirror array, in which different mirrors receive light corresponding to different communication channels. For each channel, a desired group delay value is produced by selecting the curvature of the corresponding mirror. A compensator employing a plurality of independently addressable, variable-curvature mirrors, similar to plates 302 of device 300, is capable of generation of variable, channel-specific group delays between about +400 and −400 ps/nm while maintaining transmission-band uniformity of better than about ±0.4 dB over a channel bandwidth of about 60 GHz.

FIGS. 4A–H illustrate representative fabrication steps of device 300 (FIG. 3) according to one embodiment of the invention. More specifically, FIGS. 4A–H show top views (similar to that shown in FIG. 3A) of device 300 during those fabrication steps.

Figures 4A, 4B:
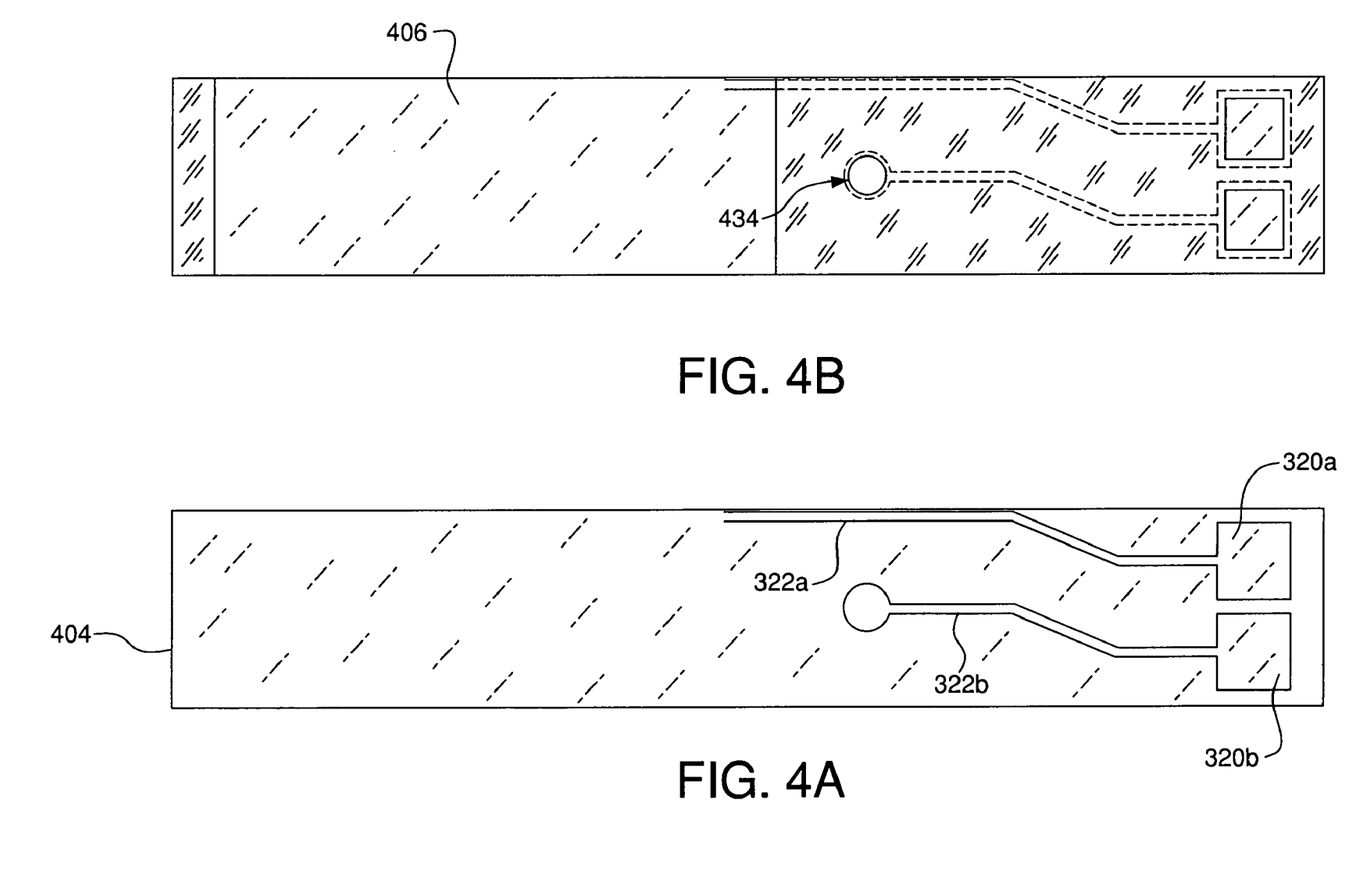
FIGS. 4A–H illustrate representative fabrication steps of the MEMS device shown in FIG. 3 according to one embodiment of the invention.

Referring to FIG. 4A, in one embodiment, fabrication of device 300 begins with a silicon-on-insulator (SOI) wafer having (i) two silicon layers, i.e., substrate layer 304 (see also FIG. 3A) and an overlayer 404, and (ii) an insulating silicon oxide layer (not visible), which electrically isolates overlayer 404 from substrate layer 304. Conducting traces 322a–b and contact pads 320a–b are defined in overlayer 404 using grooves that may be formed using reactive etching, which stops at the silicon oxide layer. The groves are schematically shown in FIG. 4A by the solid lines outlining traces 322a–b and pads 320a–b.

Referring to FIG. 4B, first, a thin (e.g., 0.1 $\mu$m) silicon nitride layer 332 (see also FIG. 3A) is deposited onto overlayer 404. Then, layer 332 is patterned and etched (i) to form an opening 434 for a future via structure that provides electrical contact between trace 322b and electrode 316b (not formed yet, see FIG. 3A) and (ii) to expose a portion 406 of overlayer 404 for the processing step illustrated in FIG. 4C. The processing corresponding to FIG. 4B can be implemented using chemical vapor deposition and reactive etching, which stops at silicon overlayer 404.

Figure 4C:
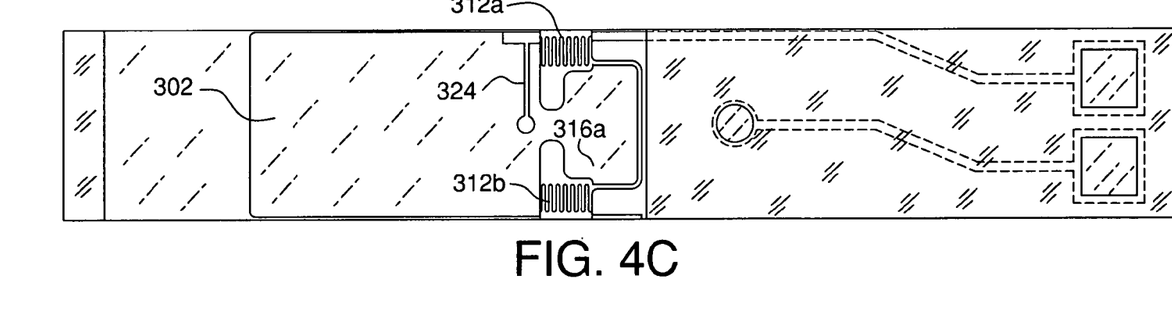

Referring to FIG. 4C, plate 302, electrode 316a, conducting trace 324, and springs 312a–b are defined in portion 406 of overlayer 404 using reactive etching similar to that corresponding to FIG. 4A. Although the two-step patterning of overlayer 404 illustrated by FIGS. 4A and 4C is advantageous in that it guards against possible residual silicon-nitride deposits, e.g., inside the fine groove structure that defines springs 312, with due care, said patterning may be implemented using a single patterning step.

Figure 4D:
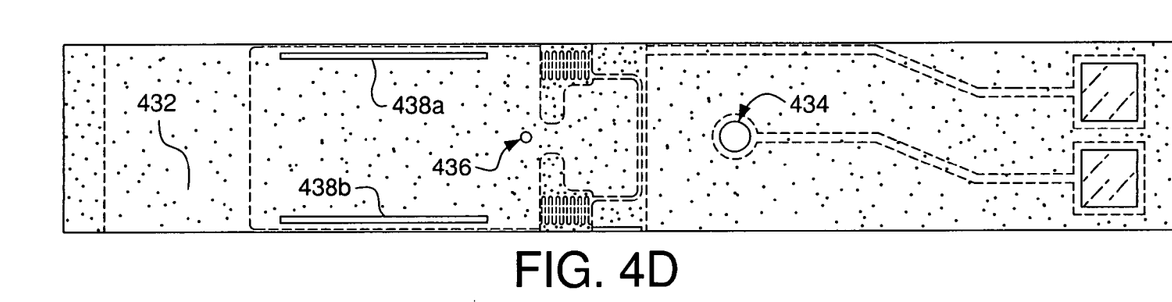

Referring to FIG. 4D, first, a thin (e.g., 1 μm) silicon oxide layer 432 is deposited over the structure of FIG. 4C. Then, layer 432 is patterned and etched to form (i) openings corresponding to pads 320a–b and to opening 434 (FIG. 4B), (ii) an opening 436 for a future via structure that provides electrical contact between trace 324 and electrodes 306b (not formed yet, see FIG. 3), and (iii) openings 438a–b corresponding to beams 308a–b (not formed yet, see FIG. 3). The processing corresponding to FIG. 4D can be implemented using chemical vapor deposition and reactive etching, which stops at silicon overlayer 404.

Figure 4E:
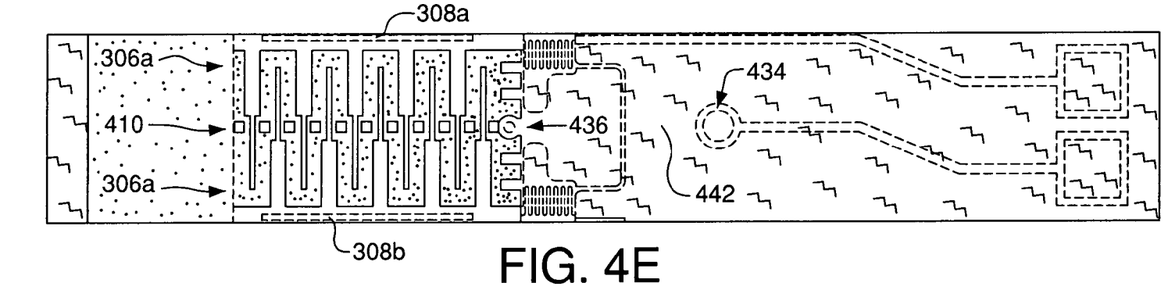

Referring to FIG. 4E, first, a thin (e.g., 5 μm) poly-silicon layer 442 is deposited over the structure of FIG. 4D. During the deposition process, poly-silicon also fills (i) openings 434 and 436 to form the corresponding via structures and (ii) openings 438a–b to electrically connect and mechanically attach beams 308a–b to plate 302. Then, layer 442 is patterned and etched to define beams 308a–b, spacers 410, and the plurality of electrodes 306a. Spacers 410 are analogous to spacers 210 (FIG. 2) and provide support to electrodes 306b (not formed yet, see FIG. 3).

Figure 4F:
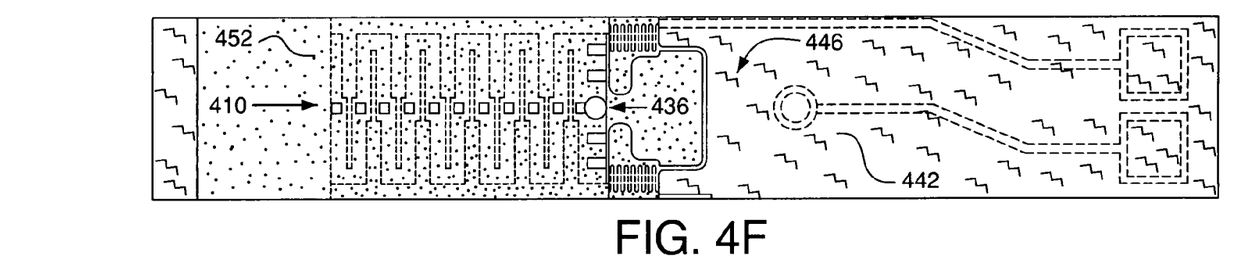

Referring to FIG. 4F, first, a thin (e.g., 1 μm) silicon oxide layer 452 is deposited over the structure of FIG. 4E. Then, layer 452 is patterned and etched (i) to expose a portion 446 of layer 442 for the processing step illustrated in FIG. 4G and (ii) to form openings corresponding to spacers 410 and the via structure of (former) opening 436.

Figure 4G:
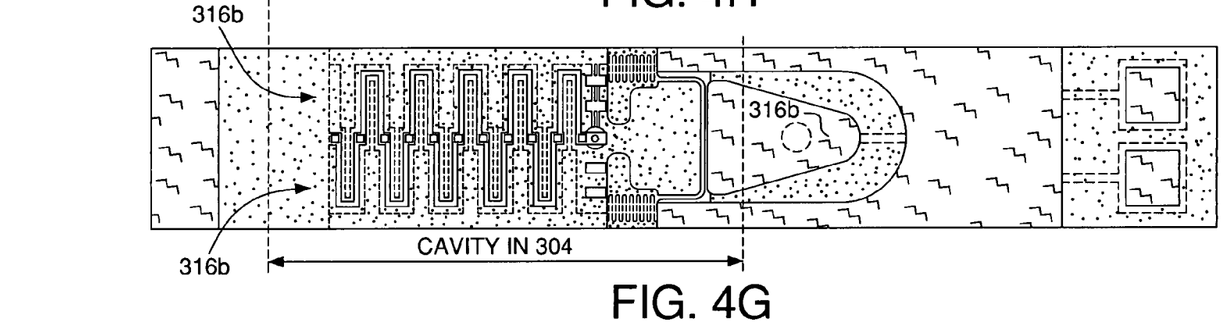

Referring to FIG. 4G, first, a thin (e.g., 5 μm) poly-silicon layer is deposited over the structure of FIG. 4F. During the deposition process, poly-silicon also fills the openings corresponding to spacers 410. Then, said poly-silicon layer and portion 446 of layer 442 are patterned and etched to define electrode 316b (see also FIG. 3) and the plurality of electrodes 306b. In addition, a portion of substrate layer 304 corresponding to the movable parts of device 300 (i.e., plate 302, springs 312, and electrode 316a) is etched away to expose the thin silicon oxide layer located between substrate layer 304 and overlayer 404 (see also FIG. 3A).

Figure 4H:
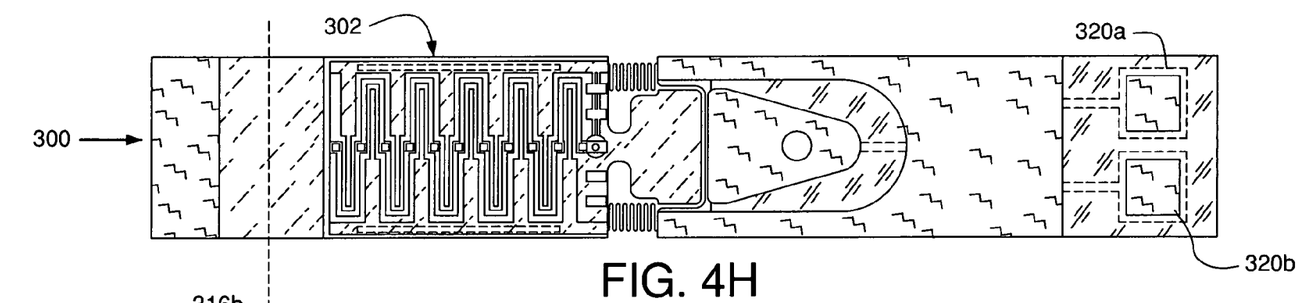

Finally, referring to FIG. 4H, exposed portions of various oxide layers are removed (e.g., etched away) to release the movable parts of device 300 and expose contact pads 320a–b. A thin layer of metal, e.g., gold, is optionally deposited over the bottom side of plate 302 for better reflectivity and over pads 320a–b for better electrical contact with wire terminals (not shown).

Different etching techniques may be used to fabricate device 300 from the initial SOI wafer. It is known that silicon etches significantly faster than silicon oxide using, e.g., selective reactive ion etching (RIE). Similarly, silicon oxide etches significantly faster than silicon using, e.g., fluorine-based etchants. Additional layers of material (e.g., layers 432 and 442, FIGS. 4D–E) may be deposited using, e.g., chemical vapor deposition. Various parts of device 300 may be mapped onto the corresponding layers using lithography. Additional description of various fabrication steps may be found in U.S. Pat. Nos. 6,201,631, 5,629,790, and 5,501,893, the teachings of which are incorporated herein by reference.

Figure 5:
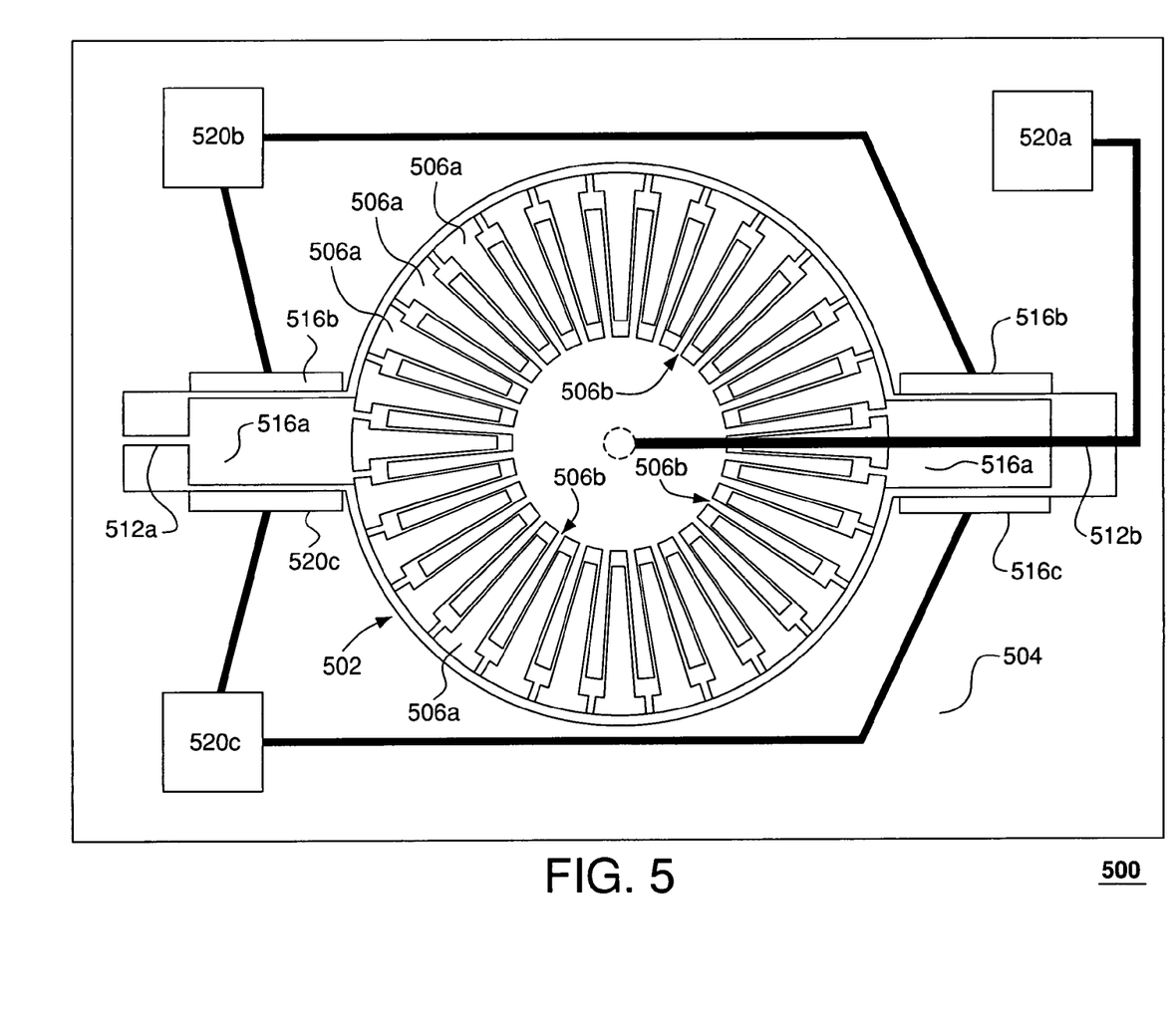
FIG. 5 shows a top view of a MEMS device according to yet another embodiment of the present invention.

FIG. 5 shows a top view of a MEMS device 500 according to yet another embodiment of the present invention. Device 500 is similar to device 300 (FIG. 3), with analogous elements of the two devices marked with labels having the same last two digits. In particular, device 500 has (i) a movable deformable plate 502 supported on a substrate 504 by a pair of torsion rods 512a–b and (ii) two electrostatic actuators 506 and 516. However, one difference between devices 500 and 300 is that actuator 506 is adapted to apply curvature to plate 502 in a circular pattern while actuator 306 is adapted to apply curvature to plate 302 along one direction. In addition, actuator 516 is adapted to tilt plate 502 with respect to substrate 504 in two opposite directions while actuator 316 is adapted to tilt plate 302 with respect to substrate 304 in just one direction. The additional degree of freedom is enabled by electrodes 516b–c, wherein electrodes 516b impart rotation onto plate 502 in the direction opposite to that imparted by electrodes 516c. Device 500 has three contact pads 520a–c to independently bias electrodes 506b, 516b, and 516c, respectively.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although fabrication of MEMS devices of the invention has been described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped membranes, plates, actuators, and/or electrodes may be implemented without departing from the scope and principle of the invention. For example, a deformable plate and the corresponding deformation actuator may be designed to produce uniform curvature across the plate when the plate is deformed. To enable said uniformity, the actuator and the plate are appropriately shaped such that the force field applied to the plate is commensurate with local stiffness variations present due to the contact areas between the plate and the actuator, e.g., along the centerline and edges of plate 302 in device 300. Similarly, the plate and the actuator may be adapted to produce deformations having various desirable one- or two-dimensional curvature patterns. Springs may have different shapes and sizes, where the term "spring" refers in general to any suitable elastic structure that can recover its original shape after being distorted. Various MEMS devices of the invention may be arrayed as necessary and/or apparent to a person skilled in the art.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising:
   a deformable plate; and
   a first actuator mounted on the deformable plate and adapted to apply a deformation force to the deformable plate to change the shape of the plate, wherein the first actuator comprises first and second electrodes mounted on the deformable plate, wherein, when a voltage differential is applied between the first and second electrodes, one of the electrodes moves with respect to the other electrode thereby applying the deformation force to the plate.

2. The device of claim 1, wherein:
the first electrode has first and second ends, wherein the first end is attached to the plate; and
the second electrode is attached to the plate, wherein:
the second end of the first electrode is movable with respect to the second electrode; and
when the voltage differential is applied between the first and second electrodes, the second end moves with respect to the second electrode thereby applying the deformation force to the plate.

3. The device of claim 2, wherein the first actuator comprises a plurality of first electrodes and a corresponding plurality of second electrodes.

4. The device of claim 3, wherein the pluralities of first and second electrodes are adapted to impart a two-dimensional curvature pattern onto the deformable plate.

5. The device of claim 2, wherein:
the first end of the first electrode is attached to a support beam extending along an edge of the plate; and
the second electrode is attached to an interior portion of the plate.

6. The device of claim 2, wherein, when the plate is not deformed, the first and second electrodes extend substantially parallel to a surface of the plate such that a gap between the surface and the first electrode is different from a gap between the surface and the second electrode.

7. The device of claim 6, wherein the second electrode is mounted on a spacer such that the gap between the surface and the second electrode is greater than the gap between the surface and the first electrode.

8. The device of claim 1, further comprising a substrate, wherein the plate is movably connected to the substrate.

9. The device of claim 8, wherein, when the plate moves with respect to the substrate, the first actuator moves together with the plate.

10. The device of claim 8, further comprising a second actuator adapted to move the plate with respect to the substrate.

11. The device of claim 10, wherein the second actuator comprises:
a third electrode attached to the plate, and
a fourth electrode mounted on the substrate, wherein, when a voltage differential is applied between the third and fourth electrodes, the third electrode moves with respect to the fourth electrode thereby rotating the plate.

12. The device of claim 10, wherein motion imparted onto the plate by the second actuator is substantially decoupled from deformation imparted onto the plate by the first actuator.

13. The device of claim 1, wherein the plate has a reflective surface.

14. The device of claim 1, wherein the device is part of a dispersion compensator.

15. A method of deforming a plate in a MEMS device, comprising:
applying to the plate a deformation force produced by a first actuator mounted on the plate and adapted to change the shape of the plate wherein the first actuator comprises first and second electrodes mounted on the plate, wherein, when a voltage differential is applied between the first and second electrodes, the electrodes move with respect to each other thereby generating the deformation force.

16. The method of claim 15, wherein:
the first electrode has first and second ends, wherein the first end is attached to the plate; and
the second electrode is attached to the plate, wherein the second end of the first electrode is movable with respect to the second electrode; and
the method comprises:
applying the voltage differential between the first and second electrodes, wherein the second end of the first electrode moves with respect to the second electrode thereby applying the deformation force to the plate.

17. The method of claim 15, wherein the plate is movably connected to a substrate.

18. The method of claim 17, wherein, when the plate moves with respect to the substrate, the first actuator moves together with the plate.

19. The method of claim 17, further comprising moving the plate with respect to the substrate using a second actuator.

20. The method of claim 19, wherein:
the second actuator comprises:
a third electrode attached to the plate, and
a fourth electrode mounted on the substrate; and
the method comprises:
applying a voltage differential between the third and fourth electrodes, wherein the third electrode moves with respect to the fourth electrode thereby rotating the plate.

21. The method of claim 19, wherein motion imparted onto the plate by the second actuator is substantially decoupled from deformation imparted onto the plate by the first actuator.

22. A MEMS device, comprising:
a deformable plate movably connected to a substrate; and
a deformation actuator mounted on the deformable plate, wherein, when the plate adopts a shape and moves with respect to the substrate without a change of the adopted shape, the actuator moves together with the plate without a change in a deformation force applied to the plate by said deformation actuator.

23. The device of claim 22, wherein the deformable plate is adapted to rotate with respect to the substrate.

24. A MEMS device, comprising:
a deformable plate movably supported on a substrate;
means for moving the deformable plate with respect to the substrate; and
means for deforming the plate, said means for deforming mounted on said plate, wherein, when the deformable plate adopts a shape and moves with respect to the substrate without a change of the adopted shape, the means for deforming the plate moves together with the plate without a change in a deformation force applied to the plate by said means for deforming.

25. A MEMS device, comprising:
a deformable plate;
a first actuator mounted on the deformable plate and adapted to apply a deformation force to the deformable plate to change the shape of the plate;
a substrate, wherein the plate is movably connected to the substrate; and
a second actuator adapted to move the plate with respect to the substrate, wherein the second actuator comprises:
a first electrode attached to the plate, and a second electrode mounted on the substrate, wherein, when a voltage differential is applied between the first and second electrodes, the first electrode moves with respect to the second electrode thereby rotating the plate.

26. The device of claim 25, wherein motion imparted onto the plate by the second actuator is substantially decoupled from deformation imparted onto the plate by the first actuator.

27. A method of deforming a plate in a MEMS device, comprising:

applying to the plate a deformation force produced by a first actuator mounted on the plate and adapted to change the shape of the plate, wherein the plate is movably connected to a substrate; and moving the plate with respect to the substrate using a second actuator, wherein:

the second actuator comprises:
a first electrode attached to the plate, and
a second electrode mounted on the substrate; and the step of moving comprises applying a voltage differential between the first and second electrodes, wherein the first electrode moves with respect to the second electrode thereby rotating the plate.

28. The method of claim 27, wherein motion imparted onto the plate by the second actuator is substantially decoupled from deformation imparted onto the plate by the first actuator.

* * * * *